United States Patent
Schumann et al.

(10) Patent No.: US 6,257,642 B1
(45) Date of Patent: *Jul. 10, 2001

(54) CAST MOLDED SEAT UNIT FOR MOTOR VEHICLES

(75) Inventors: Peter Schumann, Untersiemau; Werner Neuhauser, Weidach, both of (DE)

(73) Assignee: Brose Fahrzeugteile GmbH & Co. KG, Coburg, Coburg (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/033,924

(22) Filed: Mar. 3, 1998

(30) Foreign Application Priority Data

Mar. 13, 1997 (DE) ................................ 197 12 006

(51) Int. Cl.[7] ...................................... A47C 31/00
(52) U.S. Cl. ................... 296/65.13; 296/65.14; 296/65.15; 248/429; 297/473
(58) Field of Search ............... 296/65.13, 65.14, 296/65.15; 248/429; 297/473, 344.1, 311

(56) References Cited

U.S. PATENT DOCUMENTS

| 2,298,351 | * | 10/1942 | De Rose | 155/14 |
| 4,530,481 |   | 7/1985 | Kluting et al. | 248/394 |
| 5,167,393 |   | 12/1992 | Hayakawa et al. | 248/430 |
| 5,314,158 | * | 5/1994 | Mouri | 248/429 |
| 5,468,050 | * | 11/1995 | Hall et al. | 297/344.1 |
| 5,603,552 | * | 2/1997 | Hanna et al. | 297/473 |
| 5,810,315 | * | 9/1998 | Dinkel et al. | 248/424 |
| 5,823,499 | * | 10/1998 | Ito et al. | 248/429 |

FOREIGN PATENT DOCUMENTS

| 3703515 | 10/1987 | (DE) . |
| 9412155 | 11/1994 | (DE) . |
| 4337939 | 5/1995 | (DE) . |
| 4419139 | 12/1995 | (DE) . |
| 196 17 877 | 6/1997 | (DE) . |
| 573167 | * 6/1924 | (FR) | 248/429 |
| 44404 | * 10/1934 | (FR) | 248/429 |
| 421905 | * 1/1935 | (GB) | 248/429 |
| 62-20737 | * 1/1987 | (JP) | 248/429 |
| 38047 | * 2/1988 | (JP) | 248/429 |
| 406171408 | * 6/1994 | (JP) | 248/429 |
| WO97/02153 | 1/1997 | (WO) . |

\* cited by examiner

Primary Examiner—Joseph D. Pape
(74) Attorney, Agent, or Firm—Christie, Parker & Hale, LLP

(57) ABSTRACT

A seat unit for motor vehicles includes several seat elements such as elements for seat length adjustment, fixing and bearing elements, seat side parts, seat shell and/or gear housing. Preferably, at least two of the seat elements are formed in a one-piece cast part. More particularly, the rail units for longitudinally adjusting the seat are formed as a cast part and further seat elements are molded in one piece on this rail unit. The configuration of the individual parts of the seat unit are optimized to the anticipated load conditions, and the number of parts of the seat unit is reduced.

13 Claims, 5 Drawing Sheets

Fig. 3
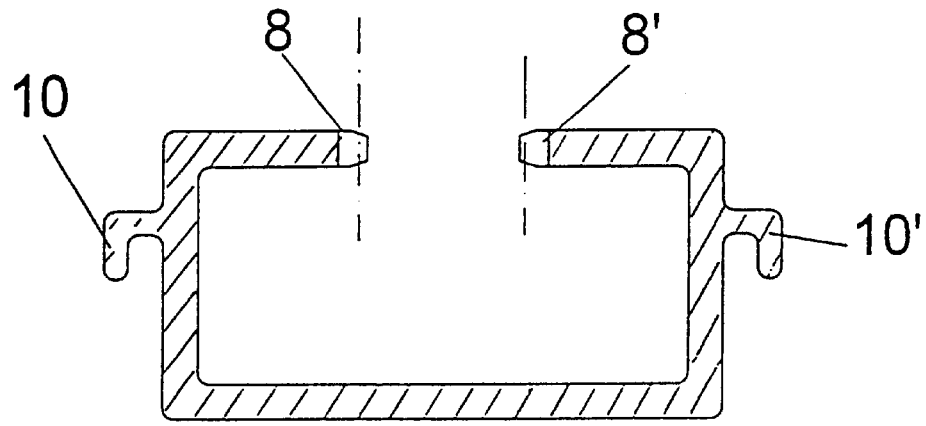
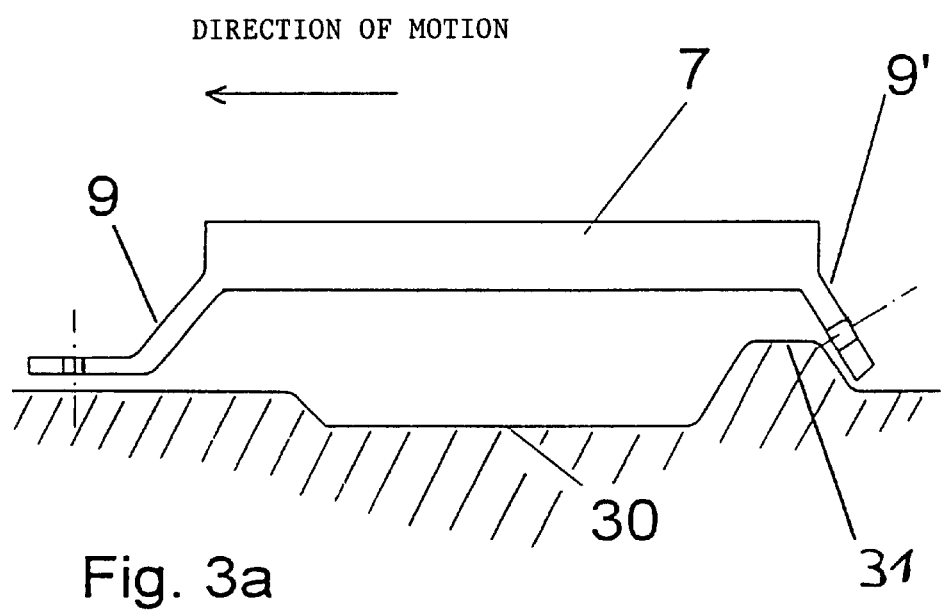
Fig. 3a

CAST MOLDED SEAT UNIT FOR MOTOR VEHICLES

FIELD OF THE INVENTION

The present invention relates generally to a seat unit for motor vehicles.

BACKGROUND OF THE INVENTION

The term "seat unit" is defined as any part of a vehicle seat which has at least two seat elements. Seat elements means all elements which belong to the structural and/or functional design of a vehicle seat including fixing and adjusting mechanisms. In particular, two rail devices for longitudinally adjusting the seat are seat elements.

From DE 37 03 515 A1 a seat unit is known where a bearing on the floor side has upper and lower rails whereby the seat can be moved forwards and backwards. The seat frame supporting a seat cushion is connected to the separated upper rails of the bearing by guide rods which are provided in the front and rear areas of the seat. Apart from longitudinally adjusting the seat, smooth-changing gears allow the height of the seat, as well as the incline of the seat, to be adjusted. These gears are fitted on the seat frame. The disadvantage with this construction is the number of individual structural elements which have to be fixed on the upper rail. This leads to relatively high production costs.

In DE 44 19 139 a device is disclosed in which the number of structural parts on the upper rail is limited. To this end, a frame construction is provided for the seat of a vehicle with a seat surface part, a backrest part and support parts for supporting the seat surface part on a rail structure mounted on the vehicle floor in the longitudinal direction of the vehicle. The support parts are formed in one piece as aluminum extruded pressed profiled parts with structural elements running in the longitudinal direction of the vehicle. Bulges are formed crosswise to the profiled plane to reinforce the profiled part against bending around an axis parallel to the longitudinal direction of the profile.

With this proposal the number of structural elements required for fixing the seat on the rail structure is reduced, however, all the additional elements (e.g., guides and gears for a longitudinal and height adjustment of the seat) must also be additionally fixed on the frame structure. Indeed, the fixing means for the individual structural parts (e.g., bores or milled areas) must generally be made by a second work step which takes place after the extrusion pressing.

From DE 94 12 155.9 U1 a rail guide is known which has two relatively displaceable rails in which one rail supports plastics-coated teeth extending along the displacement path into which a drive worm connected to the other rail engages through further gearing elements. The outer contour of the plastics-coated teeth, which consists of toothed elements or a toothed rod, corresponds to the contour of the engagement area of the drive worm teeth which are formed as inclined teething. The plastics-coating straight teeth, made by punching, can be converted into inclined teeth to produce a permanent surface contact with the worm.

A disadvantage with this solution is the expensive manufacture and number of work steps required to produce the inclined teeth.

From DE 196 17 877 A1 a rail guide is known which comprises two rails which can be displaced relative to each other in the longitudinal direction, and a gear housing connected to one of the rails by fixing means. In detail, a gear housing, connected to the first rail, is displaceable across the longitudinal direction of the rails for the purpose of adjusting play in the seat and can be locked in a position where the teeth of one displacement worm mounted in the gear housing engages with the teeth of the second rail. With this solution the two separate elements (gear housing and rail) have to be connected together by a separate fixing means which is a disadvantage.

SUMMARY OF THE INVENTION

The object of an embodiment of the present invention is to provide a seat unit where the configuration of the individual parts of the seat unit can be optimized to the anticipated load conditions, and where the number of parts of the seat unit is reduced.

According to a preferred embodiment of the present invention, at least two of the seat elements of one seat unit (e.g. elements of a seat length adjustment, seat side parts and seat shell) are formed in a one-piece cast part. Cast part preferably means any part which is made by casting using a casting mold. In addition to the standard casting process, injection or pressure casting is also a satisfactory approach. The manufacture of at least two of the seat elements as a cast part can be carried out in a simple way by means of suitable casting molds.

The manufacture of seat elements as cast parts, and more particularly a rail unit for motor vehicle seats, goes against popular opinion in the technical world that economic production would not be possible owing to the very expensive casting molds which would be required. And even if the cast parts could be manufactured economically then, in the opinion of the technical world, they would have to be made with increased wall thicknesses owing to their brittle nature and this would lead to increased weight. Moreover, they could not withstand greater stresses, for example, in the case of a crash. For this reason rail devices for motor vehicle seats have been made up until now by extrusion pressing or the like.

A preferred embodiment of the invention is based on the premise that by using a suitable casting mold a number of seat elements can be molded in a simple way on a seat element which is formed as a cast part, and more particularly on a rail device. The number of seat elements of a vehicle seat, and thus also the number of connecting means, can thereby be reduced. Furthermore tolerances are avoided which normally occur at the connecting points. The individual molded seat elements can have walls of different thickness and recesses so that the stability is guaranteed at all critical points of the seat unit and the weight can be minimized at the same time. Being formed as a cast part, the individual parts of the seat unit can be designed to optimize anticipated load conditions.

In a preferred embodiment of the invention the seat unit has a guiding rail unit fixed on the vehicle and a movable rail unit displaceably guided along the guiding rail unit. At least one of these rail units is formed as a cast part wherein additional seat elements are connected in one piece by casting to its respective rail unit formed as a cast part.

In a further embodiment of the invention, the additional seat elements molded in one piece on the rail unit comprise component parts of a seat adjustment device. By way of example, a gear housing, which is provided to hold an adjustment gear for a seat length adjustment, is molded in one piece on the rail unit formed as a cast part. The advantage of such a design is the reduction in the number of structural elements which can be manufactured in one piece in one easily implemented casting process with a suitable casting mold. This procedure avoids any type of fixing means which would have to be used to connect individual structural parts together. This leads to an efficient manufacturing process and to a simple assembly of the seat unit.

In order to improve the sliding properties of an adjusting gear located in a housing for the seat length adjustment according to a preferred embodiment and the present invention, teeth are provided preferably running on the first rail unit in the longitudinal direction of the rail while the housing for the adjusting gear is preferably molded on the second rail unit (e.g., the upper rail). The teeth of the first rail unit are preferably formed as inclined teeth so that they are adapted to the contour of the teeth of the adjustment worm of the adjusting gear. More particularly, the inclined teeth can be made directly during casting which cannot be achieved with the conventional extrusion pressing process.

In a further embodiment of the present invention the rail unit formed with teeth has a first web with inclined teeth and a second web with straight teeth. The adjustment worm only meshes with the inclined teeth in normal operation. In the event of a crash, the adjustment worm engages with the straight teeth so that an additional stability is provided.

Furthermore, it is advantageous if a bearing point for an operating element of a seat adjustment device, e.g., for a swivel mounted lever, and a stop for restricting the displacement path are molded in the rail unit formed as the cast part.

In a preferred embodiment of the present invention, the guided rail unit is formed as a cast part and supporting seat elements are molded to the rail in one piece. A seat side part and/or a seat shell of the seat unit can be one such seat element. The advantage here is the reduction in the number of component parts and thus lighter weight.

In a further preferred embodiment of the present invention, the guiding rail unit (e.g., a lower rail) is formed as a cast part and the connecting means provided for fixing the rail unit secured to the vehicle are molded in one piece on this cast part. The entire seat unit can thus be fixed simply on the floor of a vehicle.

Furthermore, through the design of a rail unit, and where applicable, additional seat elements molded thereon as one cast part, it is possible for the material thickness of the seat unit to be varied so that each area of the seat unit has exactly the required material thickness which guarantees the required stability.

In this design of the preferred embodiment of the present invention, the thickness of the material from which the rail unit, formed as a cast part, is made, can vary along the longitudinal direction of the rail. One advantage is weight reduction. Another advantage is that the thickness of the material can be selected at all points of the rail unit to minimize damage to the rail unit due to forces during vehicle collision. Particularly, at the ends of the rail, and preferably at the rear end of the upper rail, the material thickness is greater than in any other area of the rail unit so that in the event of a crash, a slight deformation of the rail is permitted without the rail ends being so severely deformed that they split. Here, a part of the crash forces is converted into deformation forces and is thereby absorbed.

The thickness of the material used to make the one piece molded seat elements on the rail unit can likewise vary, thereby reducing the weight. Further reduction in weight can be achieved by forming recesses into the seat elements.

BRIEF DESCRIPTION OF THE DRAWINGS

Further advantages of the invention will become clear from the following description of embodiments with reference to the drawings in which:

FIG. 3 is a cross-sectional view of a lower rail with teeth molded on the lower rail;

FIG. 3a is a side view of a lower rail with connecting means molded in one piece and provided to mount the lower rail fixed on the vehicle;

DETAILED DESCRIPTION OF THE INVENTION

Figure 1:
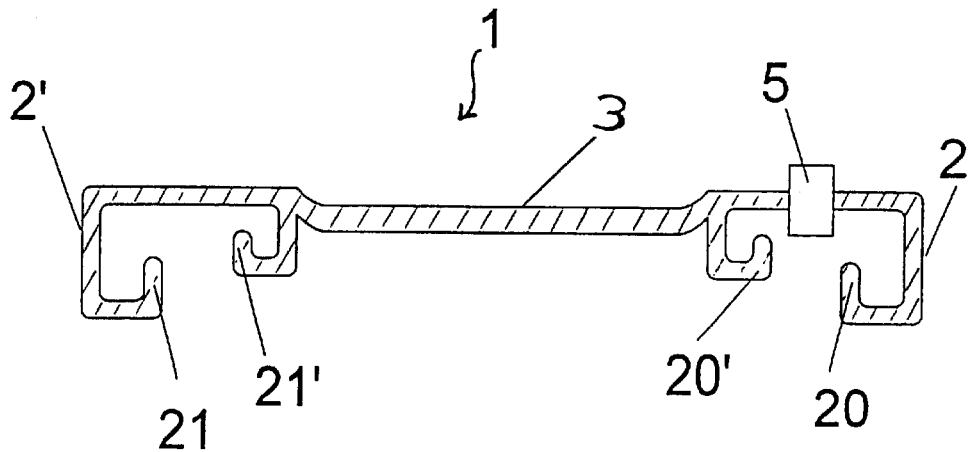
FIG. 1 is a cross-sectional view through a rail unit of a seat unit comprising two upper rails and with a molded seat shell and a gear housing for holding gearing for longitudinally adjusting the seat.

FIG. 1 shows diagrammatically a cross-sectional view of an embodiment of a rail unit of a seat unit 1 formed from two upper rails 2,2'. A seat shell 3 is molded in one piece directly on the upper rails 2,2'. Seat side parts are not provided in this flat structure embodiment. This variation naturally allows only a longitudinal adjustment and not height adjustment of the seat unit 1.

The upper rails 2,2' are formed U-shaped. The arms of the U-shaped profile of the upper rails 2,2' are formed into hook areas 20,20' and 21,21' wherein the two arms are of different length. The corresponding hook areas 20,20' and 21,21' engage in guide and hook areas of a corresponding lower rail (not shown). The two upper rails 2,2' are held by the guide in the corresponding lower rail and are displaceable along same.

A gear housing 5 for holding a gear for longitudinally adjusting the seat is molded in one piece on the closed side of the upper rail 2. Alternatively the gear housing 5 can be molded integral on one of the two side arms of the U-shaped profile.

As an alternative, or in addition to the gear housing 5 molded on the upper rail 2, a further gear housing (not shown) can also be molded on the upper rail 2' to hold a gear for longitudinally adjusting the seat.

All the seat parts shown in FIG. 1 are made in one piece by one casting process. Exemplary processes include injection molding or a pressure casting process. With these processes a suitable casting material is pressed by machine under high pressure into a suitable casting mold. This pressure is maintained until solidification. The solidified material is then removed from the casting mold.

Figure 2:
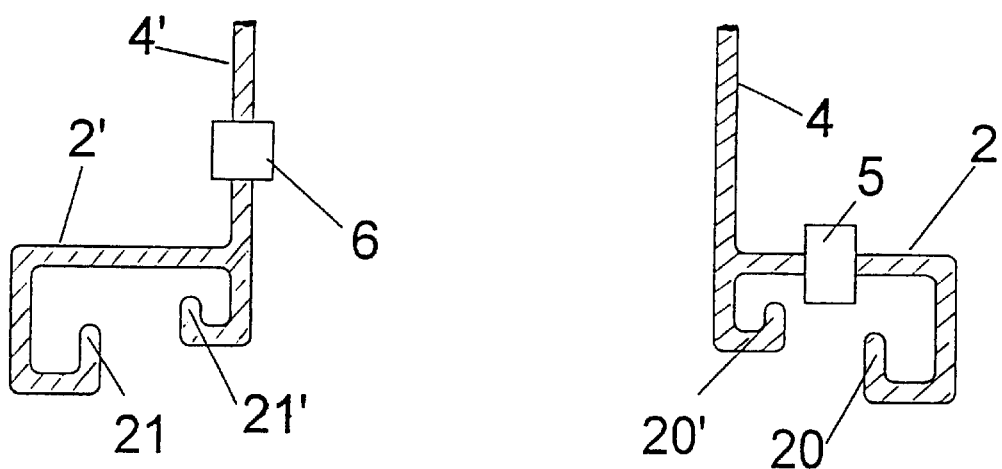
FIG. 2 is a cross-sectional view of a rail unit of a seat unit comprising two upper rails with seat side parts and gear housings for holding gears for adjusting the height and longitudinal position of the seat.

FIG. 2 shows a cross-sectional view of a further embodiment of a rail unit consisting of two upper rails. The two upper rails 2,2' have the shape of FIG. 1 with the hook areas 20,20', 21,21'.

Two seat side parts 4,4' are molded in one piece on the upper rails 2,2'. In addition to a gear housing 5 attached to the closed side of the upper rail 2 formed as a U-shaped profile, a gear housing 6 is molded in one piece on the rail unit on the seat side part 4' to hold a gear for adjusting the height of the seat. As an alternative, or in addition, a further gear housing (not shown) can also be molded in one piece on the seat side part 4 to hold a gear for adjusting the seat height.

Figure 2A:
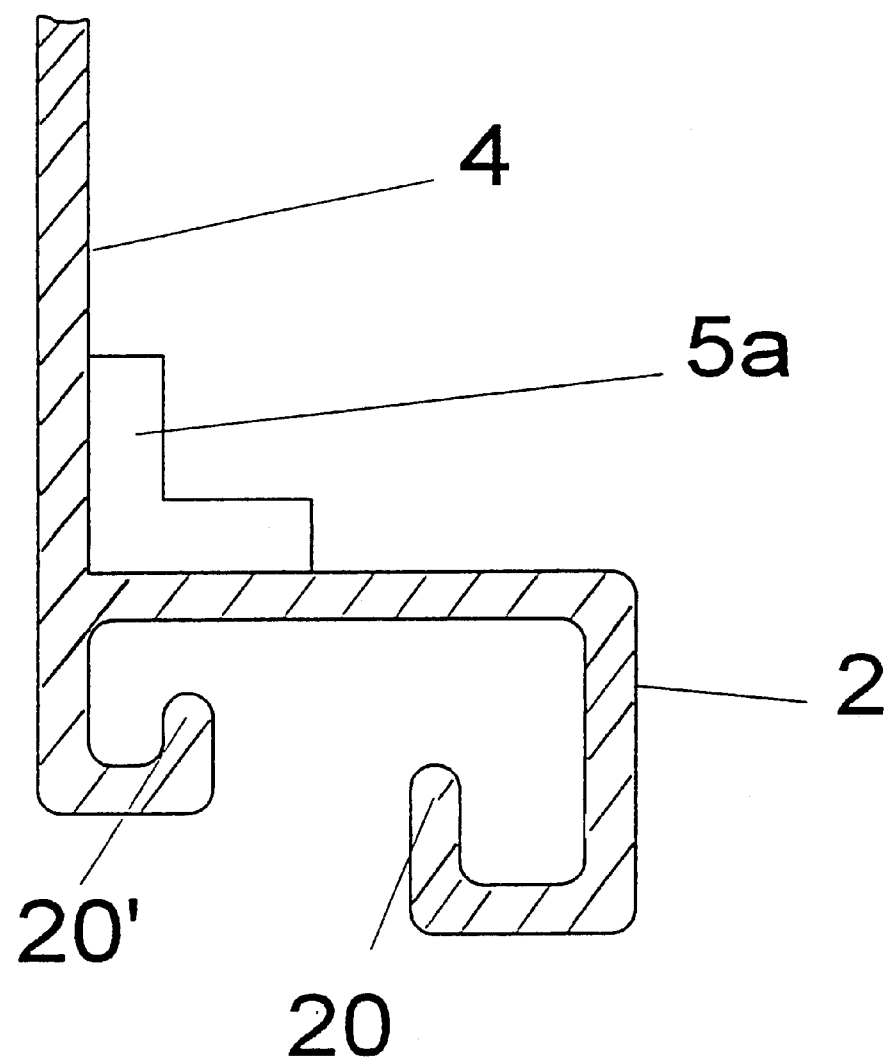
FIG. 2a is a partial view of an upper rail with a gear housing for holding a 2 or 3-action gear.

FIG. 2a shows a partial view of the rail unit of FIG. 2. The seat side part 4 is molded in one piece on the upper rail 2. An angular shaped gear housing 5a is molded in one piece both on the closed side of the U-shaped profile of the upper rail 2 and on the outer wall of the seat side part 4. The gear housing 5a preferably serves to hold one or more gear, possibly for adjusting the height, longitudinal position and cushion position of the seat.

The advantage in the case of the one-piece molding of a gear housing 5a for a multi-gear on a seat unit is the comfortable operation of the adjustment device and substitution of several gear housings with a single gear housing 5a.

FIG. 3 shows an embodiment of a lower rail 7 of a rail unit. The lower rail is formed substantially U-shaped whereby the opening of this U shape is closed in part by webs on both sides. Inclined teeth 8 are molded in one piece on the first web and straight teeth 8' are molded on the second web whereby an adjustment worm (not shown) of an adjusting gear for adjusting the longitudinal position of the seat normally engages the inclined teeth 8.

The inclined teeth are adapted to the contour of the adjustment worm. If the adjustment worm (not shown) meshes with the inclined teeth 8 molded on the lower rail 7, then as a result of the matching contours and the high overlap connected therewith, a very good force transfer is achieved.

The straight teeth 8' only engage with the adjustment worm in the event of high stresses such as in the case of a crash so that the crash forces which occur are better distributed and additional stability is provided in the event of a crash. As an alternative no teeth are formed on the second web and this only serves as support.

The teeth 8,8' of the lower rail 7 are produced directly as a cast part in a suitable casting mold, i.e., without further finishing work on the lower rail 7.

Guide and hook areas 10,10' are molded on the two outer sides of the two arms of the U-shaped profile of the lower rail 7 into which hook areas (not shown) of the upper rails 2,2' engage corresponding to the hook areas 20,20' and 21,21' in FIG. 1 so that the upper rails 2,2' are guided in the longitudinal direction in the lower rail 7 and the separation of the rails during a crash is prevented.

FIG. 3a shows the side view of a lower rail 7 which is fixed on a vehicle floor 30. The lower rail 7 has fixing elements 9, 9' molded in one piece at both its front end and rear end, with the shape of the fixing elements matching the course of the vehicle floor 30. The lower rail 7 is preferably fixed with screw connections through the molded fixing elements 9,9' to the vehicle floor 30 or to a block 31 formed on the vehicle floor.

Figures 4, 4A:
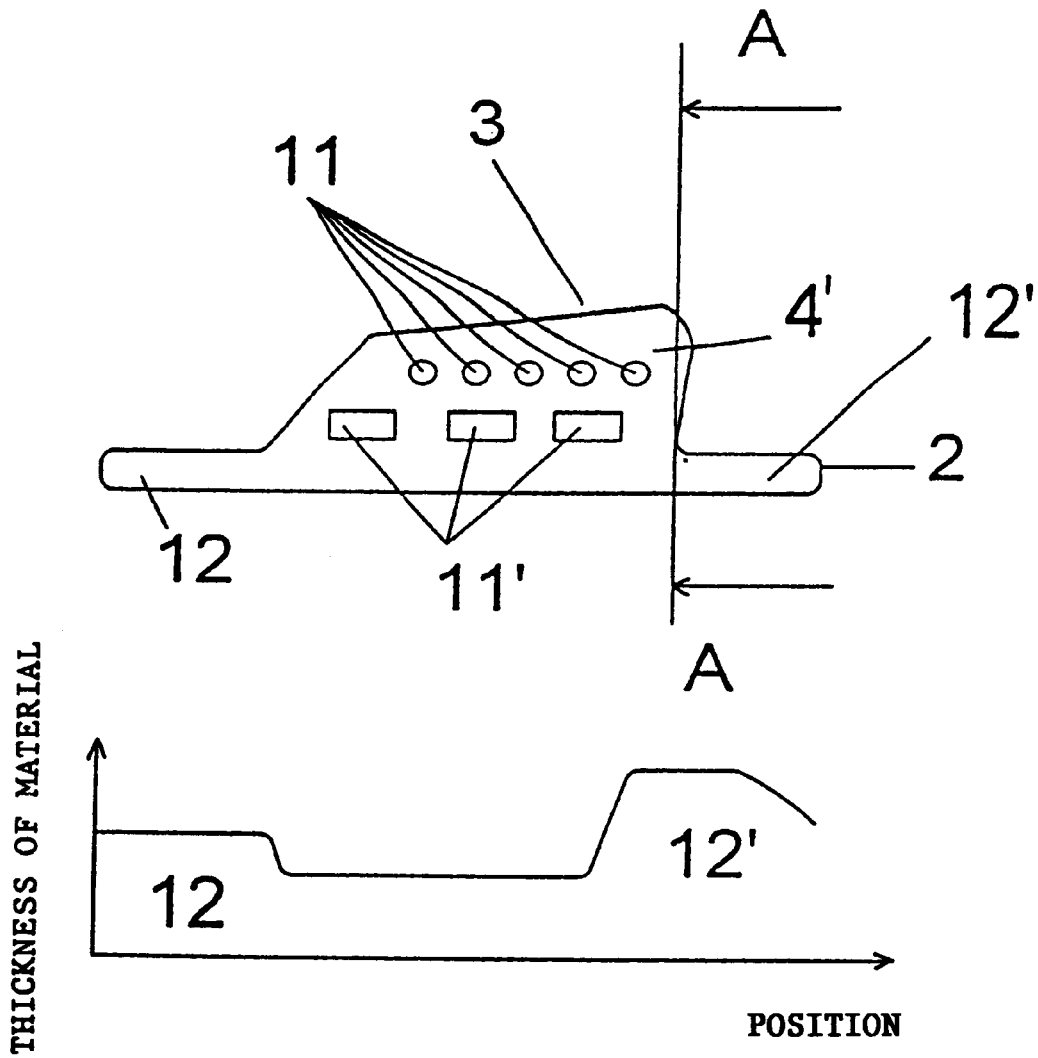
FIG. 4 is a side view of an upper rail with side parts molded thereon with recesses.
FIG. 4a shows the thickness of the upper rail of FIG. 4 as a function of position.

FIG. 4 shows a side view of an upper rail 2 of a rail unit on which a seat side part 4' and seat shell 3 are molded in one piece. The seat shell 3 runs along the inclined seat side part 4'. The upper rail 2 has two ends 12,12' projecting out underneath the seat side part 4' and seat shell 3. To reduce weight, the side part 4' has recesses 11,11'.

As can be seen in FIG. 4a, the thickness of the material of the upper rail 2 varies with the longitudinal position to achieve good weight reduction with high load stability.

So that the rail unit does not become deformed or split in the event of a crash, the material thickness is greater at the rail ends 12,12' of the upper rail 2 than in other areas.

The area of the rear rail end 12' of the upper rail 2 has the greatest material thickness. The material thickness is slightly less, however, shortly in front of the actual rail end 12' of the upper rail 2. The material thickness at the rail end 12' is, however, still always greater than in any other area of the upper rail 2.

This material thickness profile is selected so that in the event of a crash, a slight deformation of the more heavily stressed upper rail 2 is permitted without the upper rail splitting. The crash forces, which in the event of an accident appear at the rear end 12' of the upper rail 2, are converted in part into deformation forces and absorbed. Through the slightly declining material thickness at the rear end area, a somewhat softer deformation takes place first which then becomes harder.

Also with the recesses 11,11', the material thickness is generally selected so that a high load stability is ensured, and more particularly the material does not split even with a stronger deformation.

Figure 5:
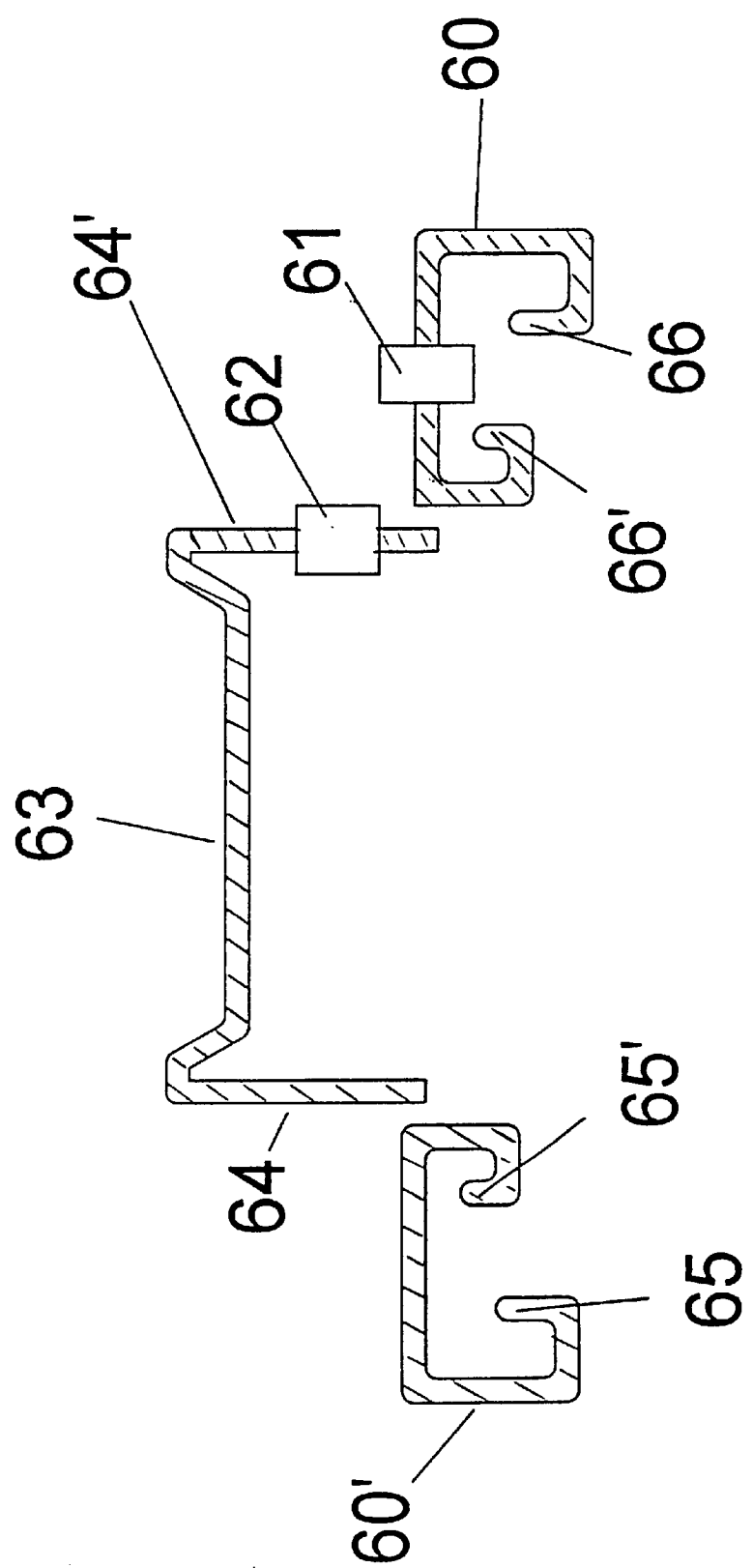
FIG. 5 is a cross-sectional view of a rail unit consisting of two upper rails and a separate seat shell with seat side parts molded on in one piece.

FIG. 5 shows a further design of a seat unit according to a preferred embodiment of the present invention. The seat unit has two upper rails 60,60' which are formed U-shaped. The arms of the U-shaped profile are formed into hook areas 65,65'66,66'. A gear housing 61 is molded in one piece on the closed side of the upper rail 60 to hold a gear for adjusting the longitudinal position of the seat. As an alternative to the cast part design, the upper rails 60,60' can be formed as extruded pressed profile or as a steel rail.

Seat side parts 64,64' are molded in one piece on a seat shell 63 formed as a cast part. In order to adjust the height of the seat, a gear housing 62 can be molded in one piece on the seat side part 64' to hold a gearing.

The seat shell 63 and the seat side parts 64,64' molded on the seat shell 63 are connected to the upper rails 60,60' by a conventional lever adjustment mechanism. With this design, the upper rails 60,60' are not connected in one piece with the seat side parts 64,64' and seat shell 63.

The invention is not restricted in its design to the embodiments given above. Rather a number of variations are possible which utilize the process according to the invention even in the case of basically quite different designs.

What is claimed is:

1. A seat unit for motor vehicles having several seat elements wherein two of the seat elements together form a single continuous one-piece cast part without separate fixing means to connect the two seat elements together, the seat unit comprising a guiding rail unit having a fixing part to fix the guiding rail unit on the vehicle and a movable rail unit guided along the guiding rail unit, wherein the two seat elements that together form the single continuous one-piece cast part without separate fixing means include one of the rail units and a further seat element of the several seat elements, wherein the further seat element comprises a component part of a seat adjustment device.

2. The seat unit according to claim 1 wherein the component part of the seat adjustment device includes a gear housing for holding an adjusting gear.

3. The seat unit according to claim 1 wherein the component part of the seat adjustment device includes teeth running in the longitudinal direction of the one of the rail units.

4. The seat unit according to claim 3 further comprising a gear housing molded on the rail unit without teeth to form another single continuous one-piece cast part without separate fixing means to connect the rail unit without teeth and the gear housing together, the gear housing for holding an adjusting gear to interact with the teeth for longitudinally adjusting the seat.

5. The seat unit according to claim 4 wherein the teeth include inclined teeth formed on a first web of the one of the rail units and straight teeth formed on a second web of said one of the rail units.

6. The seat unit according to claim 1 further comprising a bearing point for an operating element wherein the two seat elements and the bearing point together form a single continuous one-piece cast parL without separate fixing means to connect them together.

7. The seat unit according to claim 1 wherein the two seat elements that together form the single continuous one-piece cast part without separate fixing means include the movable rail unit.

8. The seat unit according to claim 7 further comprising a seat side part wherein the two seat elements and the seat side part tegether form a single continuous one-piece cast part without separate fixing means to connect them together.

9. The seat unit according to claim 8 further comprising a seat shell wherein the two seat elements, the seat side part and the seat shell together form a single continuous one-piece cast part without separate fixing means to connect them together.

10. The seat unit according to claim 1 wherein the two seat elements that together form the single continuous one-piece cast part without separate fixing means include the guiding rail unit, the fixing part formed in a single continuous one-piece cast part on the guiding rail unit without separate fixing means to connect them together for mounting the guiding rail unit fixedly secured on the vehicle.

11. The seat unit according to claim 1 wherein the thickness of the material which is used to make the one of the rail units varies along the longitudinal direction of the rail.

12. The seat unit according to claim 9 wherein the thick-ness of the material used to make the component part of the seat adjustment device, the seat side part and the seat shell varies.

13. The seat unit according to claim 11 wherein the material thickness is greater at one end of the rail unit than in any other area of the rail unit whereby the rail unit is deformable in part at this end in the presence of crash forces without splitting.

* * * * *